L. R. Streeter,

Wringer Roll,

No. 42,415. Patented Apr. 19, 1864.

Witnesses
A. Moore
Thomas C. Connolly

Inventor.
Leander R. Streeter

UNITED STATES PATENT OFFICE.

LEANDER R. STREETER, OF CHELSEA, MASSACHUSETTS.

IMPROVED ELASTIC ROLLER.

Specification forming part of Letters Patent No. 42,415, dated April 19, 1864.

*To all whom it may concern:*

Be it known that I, LEANDER R. STREETER, of Chelsea, in the county of Suffolk and State of Massachusetts, have invented a new and Improved Mode of Constructing Elastic Rollers; and I do hereby declare that the following is a full and exact description thereof, reference being had to the accompanying drawings, and to the figures marked thereon.

Figure 2:
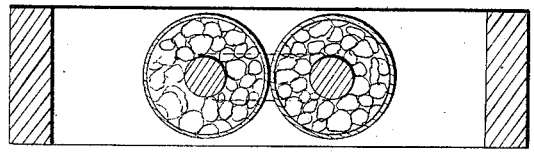
Figure 1:
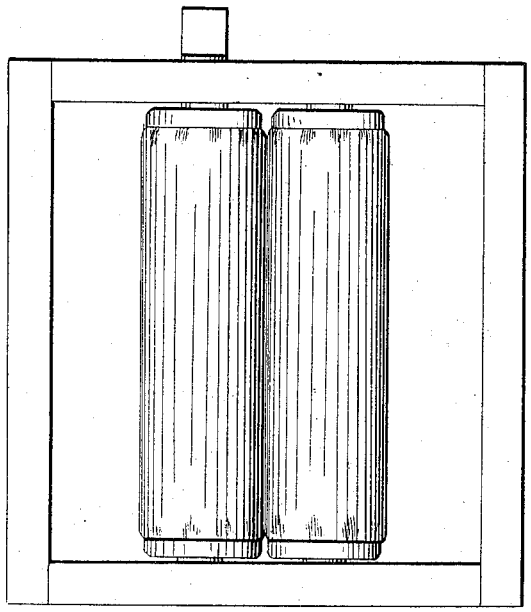

In the drawings, Figure 1 is a front view of the rollers in position to work. Fig. 2 is a section representing the case and the disintegrated caoutchouc filling.

The nature of my invention consists in constructing elastic rollers by filling (wholly or in part) a flexible cylinder or case with cut, ground, or otherwise disintegrated caoutchouc, whether the same be in a pure, vulcanized, or other condition; and I employ a shaft or gudgeons, or not, according to the mechanical mode used to give to the rollers the desired motion.

To enable others skilled in the art to make and use my invention, I will proceed to describe its construction and operation.

I use a flexible tube, made of woven, felted, or other suitable material. This I fill with disintegrated caoutchouc, (either such as has not been used, or that which has been damaged by use, and is unsuited for ordinary purposes,) wholly or in part, according as a shaft is used or not, after which the ends of the case are firmly and durably fastened. This constitutes a uniformly elastic roller, which I secure in such manner as allows a rotating motion and adapts it to clothes-wringing and other purposes.

I do not claim the flexible case, neither do I claim the use of caoutchouc in sheets, rolls, or any solid form whatever, nor do I claim any mechanical mode of using said rollers.

What I do claim as my invention, and desire to secure by Letters Patent, is—

Constructing elastic rollers by filling a flexible cylinder or case wholly or in part with disintegrated caoutchouc, whether damaged by use or not, for the purposes and substantially as described.

L. R. STREETER.

Witnesses:
    A. MOORE,
    THOMAS C. CONNOLLY.